April 10, 1945. LE ROY G. STORY 2,373,612
MANUFACTURE OF MOTOR FUELS
Filed March 21, 1939
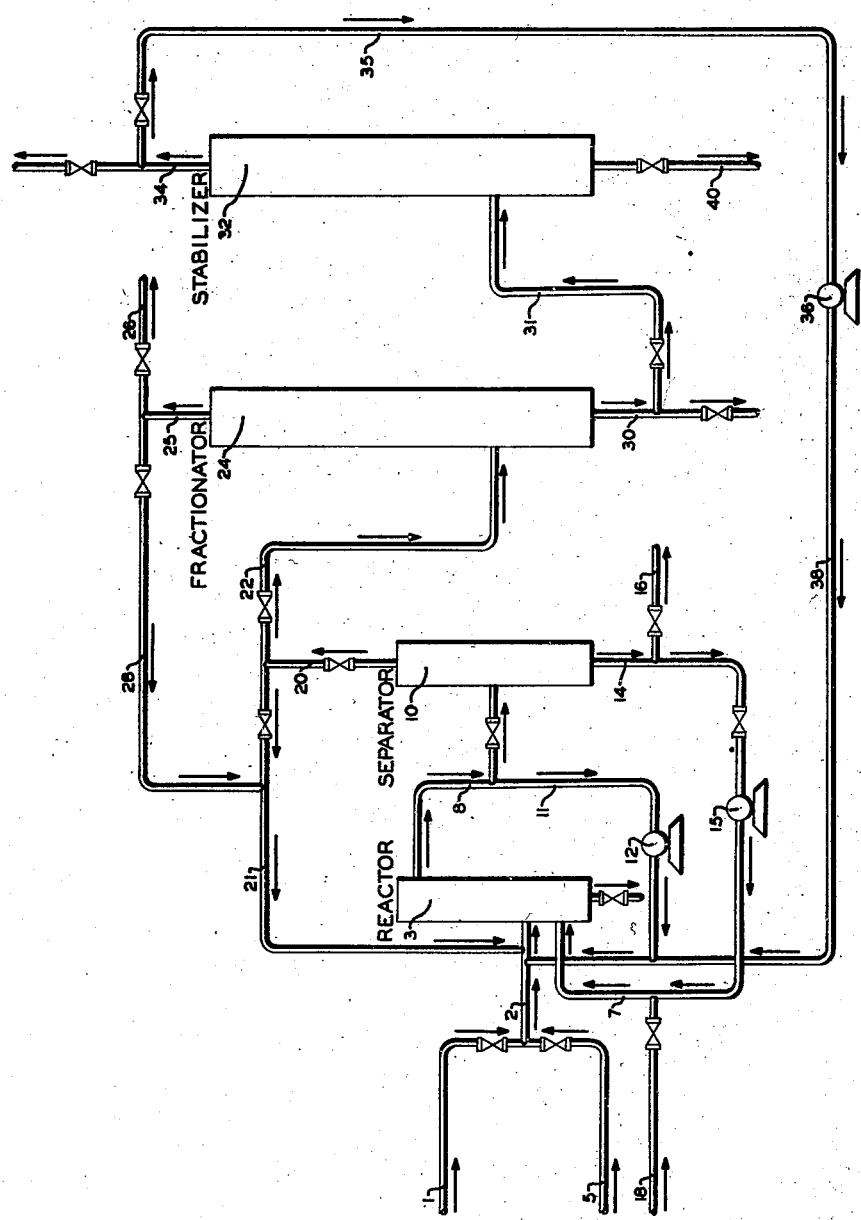
Le Roy G. Story
INVENTORS
BY
ATTORNEYS Patented Apr. 10, 1945

2,373,612

UNITED STATES PATENT OFFICE 2,373,612

MANUFACTURE OF MOTOR FUELS

Le Roy G. Story, White Plains, N. Y., assignor, by mesne assignments, to The Texas Company, New York, N. Y., a corporation of Delaware Application March 21, 1939, Serial No. 263,114

6 Claims. (Cl. 260—683.4)

This invention relates to the manufacture of motor fuels and has to do more particularly with the production of high antiknock hydrocarbons from olefins and isoparaffins.

In accordance with the invention, olefins, including normal and iso-olefins and isoparaffins, are subjected to the action of a catalyst in the presence of hydrogen whereby high antiknock, chiefly saturated, branch chain hydrocarbons within the gasoline boiling range are formed.

An object of the present invention is to obtain alkylation of isoparaffins with olefins, and prevent undesirable side reactions and increase the yield of desired hydrocarbons.

A further object of the invention is to prevent catalyst deterioration whereby the life of the catalyst is substantially increased.

It has been known heretofore that isoparaffins may be alkylated with olefins in the presence of catalysts, such as sulfuric acid or aluminum chloride, providing a high ratio of isoparaffins to olefins is maintained in the reaction mixture. In these operations, however, side reactions and deterioration of the catalyst occurs, particularly if a high ratio of isoparaffins to olefins is not maintained.

It has now been found that it is advantageous to carry out reactions involving alkylation in the presence of hydrogen or a hydrogen producing material or a hydrogen containing gas. The amount of hydrogen may vary considerably, for example a hydrogen pressure of 50, 100, 150, 300, 500, 1000 or 3000 pounds may be used. It is preferable to use a hydrogen pressure of about 50 to 500 or 1000 pounds. The hydrogen may function primarily to control the course of the reactions and increase the life of the catalyst.

The catalysts contemplated are sulfuric acid of about 90 to 100% and preferably about 94 to 98% $H_2SO_4$; a metallic halide alone, or preferably with a hydrogen halide, such as $AlCl_3$ or $BF_3$ and HCl or HF; a metallic halide and a metal, with or without a hydrogen halide, such as $AlCl_3$, Al, and HCl, or $BF_3$, HF and Ni; and liquid hydrogen fluoride.

The temperatures of operation will depend somewhat upon the materials treated, the catalyst, and the nature of the reaction involved. Broadly, temperatures of about —10° to 100° C. are contemplated, although ordinarily temperatures of zero to 75° C. are desirable.

The hydrocarbons to be treated may comprise isoparaffins and olefins mixed with normal paraffins, either gaseous or liquid. Low boiling paraffins and olefins, such as normally gaseous hydrocarbons of 2 to 5 carbon atoms, for example cracking still gases, are suitable, although gasoline hydrocarbons or heavier, either straight run or cracked are contemplated. Some of the more specific applications of the invention will now be discussed.

In the alkylation of low boiling isoparaffins with olefins, for example the alkylation of isobutane with $C_3$ or $C_4$ olefins, in the presence of sulfuric acid, although low temperatures of —10 to about 30° C. and a large excess of isobutane is used, considerable catalyst deterioration is experienced. However, by effecting the reaction under several atmospheres of hydrogen such catalyst deterioration is substantially reduced.

The alkylation of isoparaffins with olefins in the presence of aluminum chloride and hydrogen chloride at ordinary temperatures is difficult because of rapid catalyst deterioration and tendency toward polymerization, particularly of the iso-olefins. By using several atmospheres of hydrogen pressure, the catalyst deterioration and tendency to polymerize may be largely prevented and the yield of gasoline hydrocarbons substantially increased.

The alkylation of isoparaffins with lower boiling olefins, such as ethylene and propylene is considerably facilitated by operating in the presence of hydrogen. Higher temperatures may be used, more selective reaction or less side reactions and less catalyst deterioration may be obtained.

The accompanying drawing is a diagrammatic sketch of one form of apparatus for carrying out the process of the invention.

Referring to the drawing, the hydrocarbons may be introduced into the system through branch line 1, which communicates with the main line 2 leading to a reaction chamber 3. Hydrogen may be introduced through the branch line 5 which also communicates with the line 2. While one line is shown for introducing the hydrocarbons, it is to be understood that any number of lines may be used in case it is desirable to separately inject the olefins and isoparaffins. Also a separate line for injecting the hydrogen may be used, if desired. In the reactor 3 the hydrocarbons and hydrogen are intimately contacted with the catalyst introduced through the line 7. The reactor may be provided with a suitable agitator or other means of contact, whereby the catalyst, hydrogen and hydrocarbons are intimately contacted and a suitable reaction time provided.

The products are conducted from the reactor 3 through the line 8 to a separator 10. Any portion of the products withdrawn through line 8 may be recycled to the reactor through the line 11 by the pump 12. The lines 8, 11 and pump 12 constitute an internal recycle stream into which the hydrocarbons and hydrogen from lines 1, 5 and 2 are preferably injected. It is desirable to maintain a relatively high ratio of products recycled internally to the fresh charge introduced through the line 2.

In the separator 10 hydrocarbons separate from the acid which collects in the lower portion of the separator. The spent acid is withdrawn through the line 14 and may be forced by the pump 15 through the line 7 to the reactor 3. Any portion of the spent acid may be withdrawn from the system through the line 16. Fresh make-up acid may be charged to the system through the line 18 which communicates with the line 7.

The hydrocarbons collecting in the upper portion of the separator 10 are withdrawn through the line 20. Any portion or all of the hydrocarbons may be returned to the reactor 3 through the branch line 21. The remainder of the hydrocarbons is conducted through the branch line 22 to a fractionator 24, which is preferably maintained under sufficient pressure to maintain the hydrocarbons in the liquid phase. Provision is made whereby hydrogen may be withdrawn from the top of the fractionator through the line 25 and discharged from the system through the branch line 26 or recycled to the system through the branch line 28 which communicates with the line 21 leading to the reactor 3.

The hydrocarbons are withdrawn from the fractionator 24 through the line 30 and are preferably passed through the line 31 to a stabilizer 32. In the stabilizer the light hydrocarbons, comprising mainly isobutane, are separated and released from the top of the stabilizer through the line 34. Any portion or all of the gases may be recycled through the branch line 35, pump 36 and line 38 to the internal recycle stream in line 11. The stabilized alkylate is withdrawn from the stabilizer through the line 40.

Obviously many modifications and variations of the invention, as hereinbefore set forth, may be made without departing from the spirit and scope thereof, and therefore only such limitations should be imposed as are indicated in the appended claims.

I claim:

1. In a process for the catalytic alkylation of a low-boiling isoparaffin with a low-boiling olefin to produce gasoline hydrocarbons of high anti-knock value, wherein the low-boiling isoparaffin and olefin are reacted in liquid phase under alkylation conditions in an alkylation reaction zone in the presence of an effective alkylation catalyst within the temperature range of about $-10°$ to $100°$ C. and with the isoparaffin maintained in molar excess of the olefin in said zone, and wherein some catalyst deterioration normally tends to take place, the improvement which comprises maintaining throughout said reaction zone during the period of said alkylation reaction a substantial amount of extraneously added hydrogen to provide a hydrogen pressure within said zone of 50–3000 pounds per square inch, whereby said catalyst deterioration is minimized.

2. A process according to claim 1 in which the catalyst is strong sulfuric acid, and the temperature is maintained at about $-10$ to $30°$ C., and the hydrogen pressure is about 50 to 500 pounds per square inch.

3. In a process for the catalytic alkylation of a low-boiling isoparaffin with ethylene in the presence of an aluminum halide and a hydrogen halide and a maintained molar excess of isoparaffin to ethylene, the improvement which comprises carrying out the alkylation reaction in a reaction zone at a temperature of about $0°$ to $75°$ C., and maintaining a substantial amount of extraneously added hydrogen throughout the said reaction zone during the said alkylation reaction to provide a hydrogen pressure within said zone of about 150–1000 pounds per square inch and maintain the hydrocarbons essentially in liquid phase, whereby catalyst deterioration is minimized.

4. A process according to claim 1 wherein the alkylation catalyst comprises aluminum chloride.

5. A process according to claim 1 wherein the alkylation catalyst comprises hydrogen fluoride.

6. In a continuous process for the catalytic alkylation of an isoparaffin with an olefin to produce gasoline hydrocarbons of high anti-knock value, wherein feed hydrocarbons comprising the isoparaffin and olefin are continuously introduced into an alkylation reaction zone and reacted therein in liquid phase in the presence of an effective alkylation catalyst under alkylation conditions within the temperature range of $-10$ to $100°$ C. and an excess of isoparaffin to olefin, the improvement which comprises continuously introducing a substantial amount of extraneously-added hydrogen into the said reaction zone at the locus of introduction of feed hydrocarbons thereto so that hydrogen is present throughout the said reaction zone where hydrocarbons are in contact with the catalyst and the entire alkylation reaction takes place in the presence of the extraneously-added hydrogen and under a hydrogen pressure of about 50–3000 pounds per square inch.

LE ROY G. STORY.